United States Patent

Zaleski et al.

[11] Patent Number: 5,826,669
[45] Date of Patent: Oct. 27, 1998

[54] DRILLING FLUID LOSS PREVENTION AND LUBRICATION ADDITIVE

[75] Inventors: Peter L. Zaleski, Willow Springs; David J. Derwin, Des Plaines, both of Ill.; Donald J. Weintritt, Lafayette, La.; George W. Russell, Tinley Park, Ill.

[73] Assignee: Superior Graphite Co., Chicago, Ill.

[21] Appl. No.: 763,201

[22] Filed: Dec. 10, 1996

Related U.S. Application Data

[60] Provisional application No. 60/008,653 Dec. 15, 1995.

[51] Int. Cl.$^6$ .............................. C09K 7/02; C09K 7/06; E21B 33/138
[52] U.S. Cl. ........................ 175/72; 166/292; 507/140; 507/906; 507/910
[58] Field of Search .................................. 166/282, 283, 166/292; 175/65, 72; 507/140, 906, 910

[56] References Cited

U.S. PATENT DOCUMENTS

| | | | |
|---|---|---|---|
| 2,667,224 | 1/1954 | Howard | 166/283 |
| 2,912,380 | 11/1959 | Groves | 175/72 X |
| 3,385,789 | 5/1968 | King et al. | |
| 3,444,276 | 5/1969 | Olstowski et al. | |
| 3,807,961 | 4/1974 | Markel | |
| 4,088,583 | 5/1978 | Pyle et al. | 175/69 |
| 4,160,813 | 7/1979 | Markel et al. | 423/447 |
| 4,501,329 | 2/1985 | DePriester | 166/292 |
| 4,531,594 | 7/1985 | Cowan | 175/72 |
| 4,957,174 | 9/1990 | Whitfill et al. | 175/72 |
| 5,211,250 | 5/1993 | Kubena, Jr. et al. | 175/72 |
| 5,401,719 | 3/1995 | DeBeer | 507/127 |

OTHER PUBLICATIONS

*Hawley's Condensed Chemical Dictionary*, Twelfth Edition Van Nostrand Reinhold Company, New York, 1993.

*Primary Examiner*—George A. Suchfield
*Attorney, Agent, or Firm*—Cook, McFarron & Manzo, Ltd.

[57] ABSTRACT

A method of preventing or controlling the loss of well drilling fluid into the pores and fractures of subterranean rock formations by the addition of resilient graphitic carbon particles to the drilling fluid in sufficient amounts to plug the pores and fractures. The graphitic carbon material reduces loss of circulation, lowers torque and drag, prevents casing wear while drilling, and provides a new method for the controlled release of graphite at extreme pressure. The material is non-toxic and imparts the well-known lubricating properties of graphite without contributing to surface sheen development under US EPA offshore cuttings discharge rules.

23 Claims, 1 Drawing Sheet

ROTATION TO BIT

DRILLING FLUID LOSS PREVENTION AND LUBRICATION ADDITIVE

CROSS REFERENCE TO RELATED APPLICATION

This application claims the benefit of U.S. Provisional Application No. 60/008,653, filed Dec. 15, 1995.

BACKGROUND OF THE INVENTION

This invention relates to a method of preventing or controlling the loss of well drilling fluids into subterranean formations penetrated by a drill bit, while simultaneously reducing frictional forces and wear during drilling. More particularly, this invention relates to the use of sized, resilient, graphitic carbon particles for such purposes.

Drilling fluids, also called drilling muds, are used in well drilling operations in order to carry the drilled rock fragments to the surface and provide hydrostatic pressure in the drill hole. They also act as lubrication for the drilling equipment. In many drilling operations, however, pores and fractures in the subterranean rock formations can allow the drilling fluid to escape from the downhole into the surrounding formations. This can seriously impair the drilling operation and be quite expensive due to the loss of expensive drilling fluid.

A number drilling fluid additives are known for controlling and preventing the loss of drilling fluid into subterranean formations during the well drilling process. For example, U.S. Pat. No. 4,957,174, to Whitfill et al., describes a process of correcting lost circulation of drilling fluid by adding calcined petroleum coke particles to the drilling fluid. Petroleum coke is a by-product of the petroleum refining process. It is calcined by heating it to a sufficient temperature to drive off the volatile components. This material when properly sized will plug crevices and fractures through which drilling fluid would otherwise escape. However, calcined petroleum coke particles lack resiliency and are rather abrasive.

U.S. Pat. No. 5,018,020 describes a process to prevent formation fracture and propagation during drilling by the addition of 250–600 micron particles to a drilling fluid.

U.S. Pat. No. 5,211,250, to Kubena et al., describes a process where water soluble polymers, stabilizing potassium salts and particles having a size range from 75 to 1400 microns are used to enhance the stabilization of sandstone. One of the specific particulates identified is calcined petroleum coke.

Powdered graphite has also been used as a drilling fluid additive to help prevent lost circulation. However, despite a long history of use and acceptance, dry lubricant graphite powder has had limited success when dispersed in drilling fluid for several reasons. The most frequent complaint against powdered graphite is the fact that it does not test well against organic-based lubricants using standard oil field lubricity measuring instruments, such as the Falex Friction and Wear Tester or the Baroid Lubricity Meter. Table 1, taken from the landmark torque, drag and lubricity study by Mondshine in 1970 shows that graphite did not reduce the coefficient or friction compared to a number of other additives under the same test conditions.

TABLE 1

Laboratory drilling fluid lubricity tests with graphite in water and in two water-based drilling fluids

| Lubricant | Concentration lb/bbl* | --Lubricity Coefficient-- | | |
|---|---|---|---|---|
| | | Water | Fluid A+ | Fluid B+ |
| None | | 0.36 | 0.44 | 0.23 |
| Diesel oil | 0.1 | 0.23 | 0.38 | 0.23 |
| Asphalt | 8 | 0.36 | 0.38 | 0.23 |
| Asphalt and | 8 | | | |
| Diesel oil | 0.1 | 0.23 | 0.38 | 0.23 |
| Graphite | 8 | 0.36 | 0.40 | 0.23 |
| Graphite | 8 | | | |
| and diesel oil | 0.1 | 0.23 | 0.40 | 0.23 |
| Sulfurized fatty acid | 4 | 0.17 | 0.12 | 0.17 |
| Fatty acid | 4 | 0.07 | 0.14 | 0.17 |
| Long chained alcohol | 2 | 0.16 | 0.40 | 0.23 |
| Heavy metal soap | 2 | 0.28 | 0.40 | 0.23 |
| Heavy alkylate | 4 | 0.17 | 0.36 | 0.23 |
| Petroleum sulfonate | 4 | 0.17 | 0.32 | 0.23 |
| Mud detergent, brand X | 4 | 0.11 | 0.32 | 0.23 |
| Mud detergent, brand Y | 4 | 0.23 | 0.32 | 0.23 |
| Mud detergent, brand Z | 4 | 0.15 | 0.38 | 0.23 |
| Silicate | 4 | 0.23 | 0.30 | 0.26 |
| Commercial detergent | 4 | 0.25 | 0.38 | 0.25 |
| Chlorinated paraffin | 4 | 0.16 | 0.40 | 0.25 |
| Blend of modified triglycerides and alcohols | 4 | 0.07 | 0.06 | 0.17 |
| Sulfonated asphalt | 8 | 0.25 | 0.30 | 0.25 |
| Sulfonated asphalt and diesel oil | 0.1 | 0.07 | 0.06 | 0.25 |
| Walnut hulls (fine) | 10 | 0.36 | 0.44 | 0.26 |

*Concentration in lb/bbl except for diesel oil which is given in bbl/bbl
+Fluid A -- 15 g bentonite in 350 ml water
Fluid B -- 15 g bentonite, 60 g Glen Rose shale, 3 g chrome lignosulfonate, 0.5 g caustic soda in 350 ml water
Source: Oil and Gas Journal "Drilling Mud Lubricity - Guide to reduced torque and drag," Dec. 1970

In addition, another drawback with graphite is that with the passing of time the graphite added to the fluid system tends to float to the surface of the mud pits and agglomerate as a black scum and/or stable foam. The accumulation of small amounts of crude oil picked up by the fluid during drilling further aggravates this problem. This property and behavior of graphite in drilling fluids is common and is well known to those skilled in the art. Thus, as a lubricant to reduce friction any graphite floating on the surface of the mud pit cannot be picked up by the pump suction and sent back the downhole without external mixing assistance and extra labor on the part of the rig personnel.

SUMMARY OF THE INVENTION

The present invention solves the above problems by using a resilient graphitic carbon particle drilling fluid additive that is effective at preventing and controlling loss of drilling fluid into subterranean formations and has good lubrication properties.

More particularly, with the present invention pores and fractures in shales, sandstones, and the like are effectively sealed with resilient graphitic carbon particles that can be tightly packed under compression in the pores and fractures to expand or contract without being dislodged or collapsing due to changes in the equivalent circulating density or with an increase in fluid weight. For most applications, about 90% of the particles are generally sized between about −20 to +200 mesh U.S. Standard.

Graphitic carbon particles are generally considered to be resilient if, after applying a compaction pressure of 10,000 psi the particles will rebound by at least about 20 (vol) %, and preferably at least about 35%. Values of up to 150% rebound of the compacted material have been obtained in some samples. This is considerably more resilient than, for example, calcined petroleum coke. One of the preferred graphitic carbon particles, made by Superior Graphite under the commercial name DESULCO 9019 carbon additive, may have a resiliency of up to about 100–150%, while calcined petroleum coke has a resiliency of only about 20%. Another preferred graphitic particle is made by Superior Graphite under the commercial name Series 9400 Spherical Graphitic Carbon. It generally has a lower resiliency, between about 35–42%. However, its spherical shape is believed to impart other desirable characteristics for use as a drilling fluid additive, such as improved flow properties.

Because of the property of resiliency, few particles are crushed and in no case will a dense pellet result. With an increase or decrease in pressure on the compacted particles the volume will change but the particles remain separate and do not combine to form a compact cake as with other drilling fluid loss prevention additives.

The resilient graphitic carbon particles do not soften in mineral oil, crude oil, and/or alkali with time and temperature normal to oil well or geothermal drilling operations.

Moreover, another substantial benefit of the invention is that torque and drag in the drilling operation can be reduced by the addition of the resilient graphitic carbon particles of the present invention, for example, by spotting a pill of about 40 bbl volume containing a multitude of resilient graphitic carbon particulates between the drill pipe and hard abrasive formation. The concentration of graphitic carbon particles successfully used in the field ranges from about 30 lb/bbl to 120 lb/bbl in a 40 bbl sweep.

Similarly, graphitic carbon at 2 to 6 lb/bbl in the whole fluid system will reduce casing wear by physically separating the two metal surfaces with resilient graphitic carbon particles.

Another aspect of the invention is that it conserves resources and increases overall efficiency of the drilling operation. The resilient graphitic carbon material accomplishes this because each particle consists of a graphite and carbon matrix. Preferably at least about 20% or more is graphite. In one of the preferred additives, made from delayed petroleum coke, the graphitization may reach 80–95%.

This graphitized structure contributes a number of practical benefits to the drilling operation:

(1) Where high concentrations of 100 lb/bbl or more are required to the prevent loss of the hole, the −20 to +200 mesh graphitic carbon particles are course enough that the drilling fluid does not require as much pumping energy as an equal weight of powdered graphite (1 to 75 micrometer) would require. Indeed, experiments with any fine particulates used to seal loss zones "lockup" the drilling fluid to such an extent that it is no longer pumpable.

(2) The sized −20 to +200 mesh particles are instantly available to plug porous, depleted sands or to bridge fractures, if the formation penetrated by the bit breaks down. Laboratory tests over a 1-inch thick bed of −16 to +30 mesh sand presented in Table 3, infra, shows that resilient graphitic carbon in the −20 to +200 mesh size range seals off the porous zone in a manner acceptable to the drilling industry. A number of successful field tests utilizing approximately 400,000 lb of graphitic carbon confirm the prediction of the laboratory tests.

(3) Resilient graphitic carbon particles reduce friction and wear by two methods. First, the strong resilient particles, when present in sufficient concentrations, physically prevent the drill pipe from rubbing against the steel casing. For example, a 4.5 inch drill pipe rubbing against casing can approach point loads of 80,000 psi thus leading to metal removal in the form of deep scars that may become the site of stress corrosion problems or casing leaks later in the life of the well. A similar effect has been observed in an uncased open hole where resilient graphitic carbon separates the drill pipe from contact with a hard abrasive formation. Torque required to turn the drill pipe is reduced dramatically. For example, two lb/bbl of resilient graphitic carbon added to a water-based fluid in a field test well in Oklahoma reduced rotary table amperage by 500 amps from a high of 2330 amps. This enabled the operator to continue drilling until the bit passed a tight spot of hard quartzite sandstone. Hence, in the best case, the particles prevent two surfaces from contacting each other.

The second way resilient graphitic carbon particles reduce friction and wear is, in the worst case, at extreme pressure, where graphite particles located at the point of extreme pressure are crushed. At that instant the composite particles break into smaller sized graphite that continue to reduce torque and drag in the classical sense. However, because of this controlled release principle, in no instance is so much graphite released that it causes adverse effects on plastic viscosity, yield point or on the formation of a sheen when discharged overboard with drill cuttings, as occurs with adding the same amount of graphitic power.

Thus, the resilient graphitic carbon particle additive of the present invention is a cost effective way, in a drilling fluid environment, to deliver the well known lubricating properties of graphite to the exact point in the well bore where the problem is.

BRIEF DESCRIPTION OF THE DRAWINGS

In describing the preferred embodiment of the invention, reference is made to the following drawings, wherein.

DETAILED DESCRIPTION OF THE PREFERRED EMBODIMENTS

Preferred Composition

Figure 1:
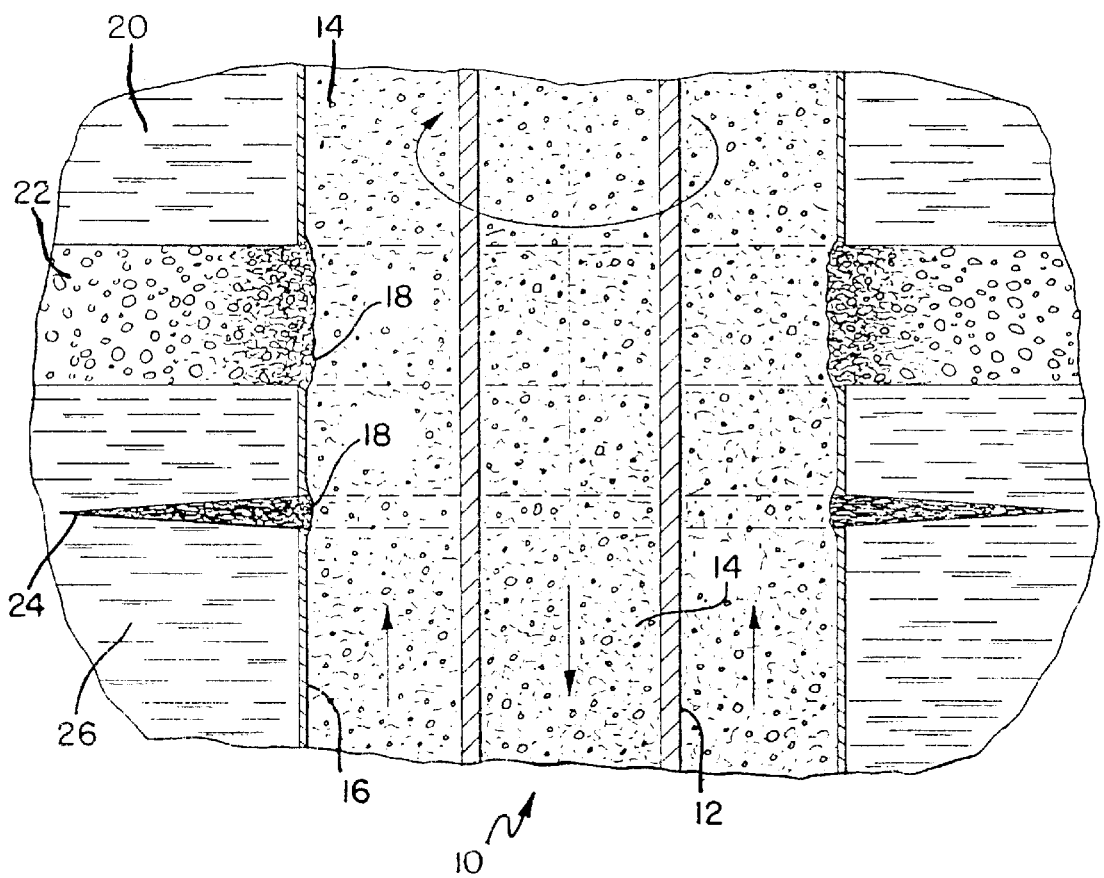
FIG. 1 is a diagrammatic cross-section of a well drilling operation through subterranean formations with graphitic carbon added to the drilling fluid.

One of the preferred resilient graphitic carbon particles for use in the present invention is a composite of up to about 80 to 95 percent graphitic carbon and most of the remainder being ungraphitized carbon. Such product has been commercially named DESULCO 9019, carbon additive and is manufactured using Superior Graphite's special DESULCO furnace purification process, described in U.S. Pat. No. 4,160,813, hereby incorporated by reference. Another preferred graphitic carbon product for use in the present invention is Superior Graphite's commercially known 9400 Series Spherical Graphitic Carbon, also made with the DESULCO purification process. The 9400 product is another resilient graphitic carbon product (although less resilient than the DESULCO 9019 carbon additive) which makes an effective drilling fluid additive. The preferred raw material source for both products is petroleum coke. The preferred DESULCO 9019 carbon additive is generally made from delayed petroleum coke, while the preferred 9400 Series product is generally made from fluidized petroleum coke. Superior Graphite's 5000 series synthetic graphite may also be used.

The conversion from coke into graphitic carbon is generally conducted in a two-step, high temperature process. The first part of the process is to calcine the coke to remove volatile hydrocarbons that would interfere with the process of graphitization. The second part is to convert some of the carbon, preferably at least 20% or more, of the calcined coke to synthetic graphite in an electric furnace. The graphitization is accomplished at temperatures of about 2200° to 3000° C. (usually for about 15 min. to several hours). The graphitized material is then crushed and sized for well drilling fluid applications.

This process reduces sulphur and heavy metals content of the original coke, thus making the product non-toxic and inert to reaction with other drilling fluid chemicals. One of the preferred graphitic carbons, the DESULCO 9019, carbon additive for example, has an $LC_{50}$ of about 700,000 ppm. This permits its use in drilling fluids used in environmentally sensitive areas.

Typical compositions of preferred resilient graphitic carbon material for use in drilling fluids is shown in Table 2 as follows:

TABLE 2

| | Preferred Range | | |
|---|---|---|---|
| | DESULCO 9000 Carbon Additive | Purified Fluid Coke 9400 | Synthetic Graphite 5000 |
| Total Carbon Content, Percent | 99.7+ | 99.7+ | 98.0+ |
| Graphite, Percent | 80–95 | 80–95 | 90–95 |
| Particle Density, g/cc[1] | 1.45–1.75 | 1.70–1.85 | 2.10–2.20 |
| Resiliency, Percent[2] | 100–150 | 36–42 | 35–60 |

[1]Measured by Helium pycnometry
[2]Resiliency is the percentage increase in sample volume (coefficient of expansion) after release of 10,000 psi (703.7 Kg/cm$^2$) compaction pressure.

In some applications, it is desirable to have the particles of the mud sized to 100% less than +200 mesh and 95% greater than about 8 microns, so that all of the graphitic carbon will pass through a fine mesh, rig shaker screen. Such composition suffers a loss in resiliency, but has the advantage that seepage losses of the drilling fluid into formations with less severe losses of fluid can be controlled on a continuous basis because the particles will not be filtered out of the circulating drilling fluid by the solids control apparatus.

Where the graphitic carbon particles are used primarily for lubrication, it is desirable to size the particles between about +20 mesh to 8 microns. It is then added in concentrations of about 20 lb/bbl to 120 lb/bbl.

Resiliency

The resiliency of one of the preferred graphitic carbon particles, made from delayed petroleum coke, is about 100–150%. This compares to a tested resiliency for calcined petroleum coke of about 20%. The resiliency of the other preferred graphitic carbon product, made from fluid petroleum coke, is about 35–42%.

The resiliency test procedure used involves first filling a compression test mold with 16 grams of dried, finely divided material to be tested. Compress the material in a hydraulic press until the gauge needle reads zero. Measure and record the height of the mold. Compress to 10,000 psi and measure height again. Release pressure and remove the mold from the press. Allow it to stand until no more expansion is noticed. Measure the height of the mold one last time. This height minus the height at 10,000 psi divided by the height at 10,000 psi times 100 is the percent expansion.

As already noted, the resiliency of the graphitic carbon particles of the present invention imparts a number of desirable properties.

Bridging and plugging

FIG. 1 shows a cross-section of an oil well downhole 10, with a rotating drill pipe 12, and drilling fluid 14 being pumped down the pipe interior and returning up the exterior between the drill pipe surface and the downhole wall 16. In the example shown, the downhole is bored through, from upper to lower, a shale formation 20, a depleted sand formation 22, a fractured shale formation 24, and another shale formation 26. Graphitic carbon particles 18 collect at and plug the pores of the depleted sand formation 22 and the fractures of the fractured shale formation 24 to prevent drilling fluid from being lost. Moreover, since the graphitic carbon is generally resilient, the particles will compress and expand in the downhole wall with changes in pressure without being crushed or dislodged.

The efficacy of the preferred resilient graphitic carbon particles at preventing loss of drilling fluid was tested as follows:

Four 1 bbl equivalents of a 12 lb/gal PHPA polymer base drilling fluid were stirred with −20 to +200 mesh resilient graphitic carbon particles at concentrations of 10, 20 and 30 lb/bbl. One sample was carried along as a "Blank." As the mixing of each fluid sample was completed it was poured into a standard 100 psi API Filtration Cell and onto a 1-inch thick bed of 16/30 mesh gravel pack sand. The cell was sealed and pressurized to 100 psi. The results set forth in Table 3 show that the cell with the fluid containing no graphitic carbon blew dry immediately on application of 100 psi differential pressure. However, samples containing 10, 20 and 30 lb/bbl graphitic carbon quickly sealed off loss of whole fluid. At 30 lb/bbl for example (Run 4) no fluid whatsoever passed through the 16/30 bed of sand and the filtrate that did pass through after a period of time was free of solids.

TABLE 3

| Seepage Control Tests over 16/30 Gravel Pack Sand | | | | |
|---|---|---|---|---|
| RUN NO. | 1 | | | 4 |
| DESCRIPTION | BLANK | 2 | 3 | SO 77-3 |
| Bbl | 1.0 | 1.0 | 1.0 | 1.0 |
| Conc, lb/bbl | 0 | 10 | 20 | 30 |
| Vol to shut-off, ml | B/O | 21 | 14 | 0 |
| Time to shut-off, sec | | 12 | 3 | 0 |
| Filtrate color after shut-off | Whole fluid | Muddy | Clear | Clear |

B/O = Blowout

Restriction to attrition by high shear

Figure 2:
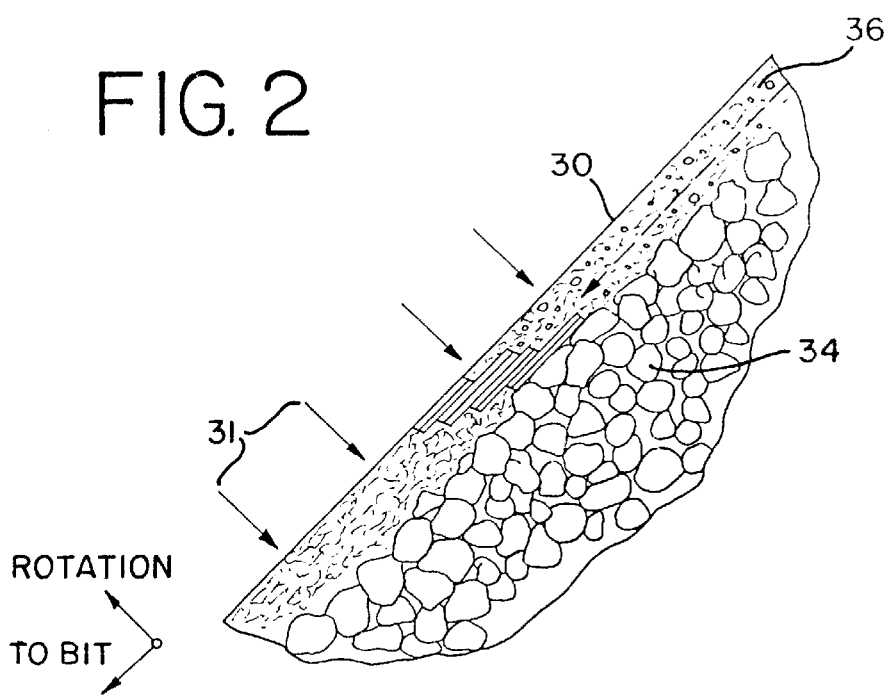
FIG. 2 is a diagrammatic cross-section showing the lubricating effect of graphitic carbon.

FIG. 2 shows a magnified cross-section of a rotating drill pipe surface 30 under extreme pressure (indicated by arrows 31) being protected from contacting a hard, abrasive downhole wall formation 34 by free graphite 32 within the drilling mud 36. Graphitic carbon particles release free graphite only when extreme pressure and rolling friction created by the drill pipe crush the composite structure of the graphitic carbon particles. Otherwise, the graphitic carbon particles generally remain intact, thus maintaining their beneficial properties in that form, and avoiding the undesirable effects associated with powdered graphite.

An attrition test was conducted to study the shear characteristics of the preferred graphitic carbon particles of the present invention. The test involved applying high shear stress to a drilling fluid sample containing resilient graphitic carbon particles and observing the amount of the particles that disintegrate over a given period of time. The test data in Table 4 below are based on the effect of stirring a test sample of drilling fluid with DESULCO 9019 graphitic carbon additive (sized between −20 mesh and +200 mesh) at shear rates of 23,000 rpm for 90 minutes in a SS mixing cup on a Hamilton Beach No. 30 mixer. For comparison, a control sample of plain bentonite drilling fluid without graphitic carbon was tested under the same conditions using the same mixer.

To simplify the attrition test, a 30 mL aliquot of the fluid was wet screened over a 200 mesh sieve. The volume of residue on the screen after washing it free of colloidal clay solids was taken as a measure of the change in volume of the graphitic carbon due to the effect of shear.

Table 4 shows that the graphitic carbon fluid test mixture lost only about 1% volume under the test conditions after 90 minutes. This indicates that graphitic carbon particles are resistant to the high velocity and chopping action of the mixer blades.

Of equal significance is the fact that the color of the bentonite fluid did not turn black, as would be expected if the graphitic carbon had disintegrated. The resistance to attrition, despite the very high shear, is attributed to the resilient nature of the graphitic carbon particles.

TABLE 4

Attrition Rate of graphitic carbon in fresh water bentonite drilling fluid

| Composition | TEST Fluid | BASE Fluid |
|---|---|---|
| Tap water, bbl | 1.0 | 1.0 |
| Bentonite, lb/bbl | 20 | 20 |
| Graphite, lb/bbl | 20 | 0 |
| Stir @ 23,000 rpm on HB #30 0 minutes | | |
| Volume % on 300 Mesh After 90 minutes | 10.0% | 0.2 |
| Volume % on 200 Mesh | 9.0% | 0.2 |

Abrasivity index of graphitic carbon against 1020 mild steel

Another characteristic of importance is the relative abrasivity of the graphitic carbon particles. If too abrasive, the graphitic carbon would unduly erode the steel drilling components. Accordingly, a modified API test on the "abrasiveness of weighting materials" was conducted in order to assess the abrasiveness of the preferred graphitic carbon particles of the present invention.

The test consisted of adding 200g of the preferred graphitic carbon material to 350 ml of fluid (equivalent to 1 bbl and mixing at 23,000 rpm for 20 minutes. The loss in weight of a special steel coupon located in the mixing container was then calculated. The coupon initially weighed about 1.6g and is a nominal ⅝"×2"×0.01" in size.

Table 5 shows that the loss in weight of the steel coupon in the 200 lb/bbl sample of graphitic carbon drilling fluid mixture was no greater than obtained with the 15 lb/bbl bentonite clay control Sample A. On the other hand, Sample B containing 200 lb/bbl of API Grade Hematite (iron oxide) weighting material caused a loss of 3.6 mg/min. Moreover, calcined delayed petroleum coke was even more abrasive than the hematite and caused a loss of 6.8 mg/min, which is a 36 times higher erosion rate than for the similar size particles of the preferred graphitic carbon.

It is therefore clear that the resilient graphitic carbon of the present invention will not contribute to the abrasion or erosion and corrosion of expendables (pump liners, etc.) or of downhole motors.

TABLE 5

Abrasivity Index of Bentonite, Hematite and Desulco

| | Abrasivity Index, mg/min |
|---|---|
| Sample A | |
| 15 lb/bbl bentonite | 0.16 mg/min |
| Sample B | |
| 15 lb/bbl bentonite w/200 lb/bbl API Grade Hematite | 3.6 mg/min |
| Sample C | |
| 15 lb/bbl bentonite w/200 lb/bbl Desulco 9019 | 0.19 mg/min |
| Sample D | |
| 15 lb/bbl bentonite w/200 lb/bbl calcined delayed coke | 6.81 mg/min |
| Sample E | |
| 15 lb/bbl bentonite w/200 lb/bbl calcite (Baracarb 50 ™) | 0.60 mg/min |

Effect of graphitic carbon on the rheology of a 12.1 lb/gal PHPA drilling fluid

Another important feature of the graphitic carbon of the present invention is that it can be added to drilling fluid in substantial quantities without negatively affecting the rheology of the drilling fluid mixture.

For example, the test data below in Table 6 show that graphitic carbon can be added at concentrations up to 120 lb/bbl without "locking up" the fluid, i.e., making it too thick and viscous. It is particularly important to note that the gel strength, a measure of thixotropy, of the control sample having no graphitic carbon was 8/15 lb/100 ft$^2$. At 120 lb/bbl graphitic carbon, the initial gel strength was only 15 lb/100 ft$^2$ and after lying quiescent for 10 minutes remained at 15 lb/100 ft$^2$.

TABLE 6

The Effect of the Addition of Graphitic Carbon
on the Rheology of a 12.1 lb/gal PHPA Drilling Fluid

|  | LB/BBL GRAPHITIC CARBON | | | | |
| --- | --- | --- | --- | --- | --- |
|  | 0 | 30 | 60 | 90 | 120 |
| Apparent Viscosity, cp | 36 | 38 | 56 | 85 | 102 |
| Plastic Viscosity, cp | 26 | 27 | 47 | 89 | 88 |
| Yield Point, lb/100 ft$^2$ | 23 | 22 | 17 | 24 | 28 |
| Gel Strength, Int/10 min lb/100 ft$^2$ | 8/15 | 8/20 | 11/21 | 11/19 | 15/15 |
| Wt., lb/gal | 12.1 | 12.0 | — | 12.25 | 12.3 |

Field Test 1

A number of field tests were conducted in order to assess the efficacy of the graphitic carbon additive under actual conditions. In one test, resilient graphitic carbon was added to a lime-based drilling fluid and successfully prevented seepage loss and lost circulation in a deep hot well in South Louisiana. The material was used alone and in blends with fine mica, cellulose fiber or calcium carbonate, depending on the estimate of need as the well progressed to target depth. In all cases the material was compatible with other lost circulation or seepage loss products.

The concentration of resilient graphitic carbon ranged from 40 lb/bbl sweeps to pills spotted with 120 lb/bbl. There was a minimal effect on viscosity even at drilling fluid weights over 18 lb/gal. The well was successfully drilled to target depth. A total of about 30,000 lbs of resilient graphitic carbon were used in this field test.

Field Test 2

Another field test was conducted at an offshore drill site in the Gulf of Mexico. In this test, approximately 30,000 lbs. of resilient graphitic carbon was successfully used in a synthetic oil-based drilling fluid. The operator swept 40 bbl pills of the resilient graphitic carbon as needed and was able to successfully keep loss of the high cost oil fluid well below 1 bbl/minute.

From the foregoing, it can be seen that a method of preventing or controlling the loss of drilling fluid into subterranean formations has been provided that overcomes many disadvantages of the prior art. While the method has been described in terms of a preferred embodiment, there is no intent to limit the invention to the same. On the contrary, it is intended to cover all modification and equivalents within the scope of the appended claims. Moreover, it should be emphasized that many variations within the scope of the present invention will be apparent to one skilled in the art. For example, the graphitic carbon particles of the present invention may be mixed with other additives to achieve results desired for a particular situation. Likewise, different particle sizings may be desired depending on the nature of the pores or fractures to be plugged, or where the purpose is for lubrication rather than fluid loss control.

What is claimed is:

1. A method of improving the properties of a well drilling fluid comprising the step of adding to the drilling fluid resilient graphitic carbon particles having a size of larger than about +200 mesh.

2. The method of claim 1, wherein said particles have a resiliency of greater than about 35% rebound after compression at 10,000 psi.

3. The method of claim 2, wherein said resiliency is between about 100 to 150%.

4. The method of claim 1, wherein the size range of about 90% of the graphitic carbon particles is between −20 and +200 mesh.

5. The method of claim 1, wherein the graphitic carbon particles are added to the drilling fluid in concentrations between about 30 lb/bbl to 120 lb/bbl.

6. The method of claim 1, wherein the graphitic carbon particles are present in the whole fluid system in a concentration of about 2 to 6 lb/bbl.

7. The method of claim 1, wherein the graphitic carbon particles are made by graphitization of petroleum coke.

8. The method of claim 7, wherein the petroleum coke is a fluidized petroleum coke.

9. The method of claim 7, wherein the petroleum coke is a delayed petroleum coke.

10. The method of claim 1, wherein the graphitic carbon particles have more than about 80% graphite content.

11. The method of claim 1, wherein the graphitic carbon particles have a graphite content of about 20% or greater.

12. The method of claim 1, wherein the graphitic carbon particles have a particle density between about 1.45 to 2.2 g/cc.

13. The method of claim 1, wherein the drilling fluid is water based.

14. The method of claim 1, wherein the drilling fluid is oil based.

15. The method of claim 1, wherein said graphitic carbon particles are added to the drilling fluid in an amount sufficient to prevent loss of the drilling fluid into porous or fractured formations.

16. The method of claim 1, wherein said graphitic carbon particles are added to the drilling fluid in an amount effective to correct loss of drilling fluid to porous or fractured formations.

17. A method of reducing torque and drag when rotating, raising or lowering drill pipe, comprising the step of adding resilient graphitic carbon particles of about −20 to about +200 mesh size to drilling fluid while the fluid is being circulated.

18. A method of controlling the loss of drilling fluid from an oil well borehole into subterranean formations penetrated by a drill bit comprising adding resilient graphitic carbon particles of larger than about +200 mesh to the borehole.

19. The method of claim 18 wherein the graphitic carbon particles are added to a fluid.

20. The method of claim 18 wherein the graphitic carbon particles are combined with a seepage loss additive.

21. The method of claim 19 wherein the fluid is drilling fluid.

22. The method of claim 19 wherein said graphitic carbon particles have a resiliency of greater than about 35% rebound after compression at 10,000 psi.

23. The method of claim 20 wherein said graphitic carbon particles have a resiliency of greater than about 35% rebound after compression at 10,000 psi.

* * * * *